(12) United States Patent
Annigeri et al.

(10) Patent No.: US 10,539,218 B2
(45) Date of Patent: Jan. 21, 2020

(54) AXLE ASSEMBLY HAVING A DRIVE PINION ASSEMBLY

(71) Applicant: ArvinMeritor Technology, LLC, Troy, MI (US)

(72) Inventors: Aniruddh P. Annigeri, Troy, MI (US); Brian D. Hayes, Newark, OH (US); Pedro Garcia, Clarkston, MI (US); Robert J. Martin, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 135 days.

(21) Appl. No.: 15/684,056

(22) Filed: Aug. 23, 2017

(65) Prior Publication Data
US 2019/0063584 A1 Feb. 28, 2019

(51) Int. Cl.
*F16H 37/08* (2006.01)
*F16H 48/00* (2012.01)
(Continued)

(52) U.S. Cl.
CPC ....... *F16H 57/0025* (2013.01); *B60K 17/165* (2013.01); *B60K 17/36* (2013.01);
(Continued)

(58) Field of Classification Search
CPC .......... F16H 48/38; F16H 48/42; F16H 48/00; F16H 48/05; F16H 48/12; F16H 57/037; F16H 37/082; F16H 2057/02034; F16H 2057/02052; F16H 2200/0034; F16H 37/08; F16H 37/0806; F16H 37/0813; F16H 37/0833; F16H 57/0483; F16H 57/0018; F16H 37/10; F16H 2037/102; F16H 48/34; F16H 2048/343; F16H 2048/346; F16H 2048/364; F16H 2207/04; F16H 2702/04; F16H 2720/04; F16H 48/40; F16H 39/40; F16H 57/0025; F16H 57/023; F16H 57/038; B23P 15/14; B60K 1/00; B60K 17/16; B60K 23/04; B60K 2023/0858; B60K 7/0007; B60K 2007/0038;
(Continued)

(56) References Cited

U.S. PATENT DOCUMENTS 1,335,040 A    3/1920   Burrows
5,070,745 A   12/1991   Lindsey et al.
(Continued)

FOREIGN PATENT DOCUMENTS

GB    2029521 A    3/1980
WO    2011116192 A1   9/2011

OTHER PUBLICATIONS

Meritor, Maintenance Manual 5A, Single-Reduction Differential Carriers, Single Rear Drive Axles, Rear-Rear Tandem Drive Axles and Front Drive Steer Axles, Oct. 2015.
(Continued)

*Primary Examiner* — Jeffrey A Shapiro
(74) *Attorney, Agent, or Firm* — Brooks Kushman P.C.

(57) ABSTRACT

An axle assembly having a drive pinion assembly. The drive pinion assembly may have a drive pinion body, a pinion gear, and a side gear. The pinion gear may be fixedly disposed on a first end portion of the drive pinion body. The side gear may be fixedly disposed on a second end portion of the drive pinion body.

20 Claims, 11 Drawing Sheets

(51) Int. Cl.

| | | |
|---|---|---|
| *F16H 57/037* | (2012.01) | |
| *F16H 57/00* | (2012.01) | |
| *F16H 57/038* | (2012.01) | |
| *F16H 57/023* | (2012.01) | |
| *F16H 48/42* | (2012.01) | |
| *B60K 17/36* | (2006.01) | |
| *B60K 17/16* | (2006.01) | |
| *F16H 57/02* | (2012.01) | |
| *F16H 1/18* | (2006.01) | |

(52) U.S. Cl.
CPC ............ *F16H 37/08* (2013.01); *F16H 48/00* (2013.01); *F16H 48/42* (2013.01); *F16H 57/023* (2013.01); *F16H 57/037* (2013.01); *F16H 57/038* (2013.01); F16C 2361/61 (2013.01); *F16H 1/18* (2013.01); *F16H 2057/02052* (2013.01)

(58) Field of Classification Search
CPC .... B60K 2057/02034; B60K 2001/001; B60K 7/00; B60K 17/14; B60K 17/346; B21K 1/305
USPC .................. 29/893.1, 893.2, 893.3; 475/150
See application file for complete search history.

(56) References Cited

U.S. PATENT DOCUMENTS

| | | |
|---|---|---|
| 9,133,926 B2 | 9/2015 | Hayes et al. |
| 9,657,829 B2 | 5/2017 | Yu |
| 2003/0203783 A1* | 10/2003 | Sullivan ................. B60K 17/16 475/221 |
| 2004/0079562 A1* | 4/2004 | Oates .................... B60K 17/16 180/24.11 |
| 2005/0101430 A1 | 5/2005 | Ziech |
| 2014/0179483 A1* | 6/2014 | Kahl ..................... B60K 17/36 475/230 |
| 2016/0038994 A1 | 2/2016 | Leicht |
| 2016/0245385 A1* | 8/2016 | Heller .................... F16H 48/42 |
| 2016/0298744 A1* | 10/2016 | Bujold ................... F16H 48/08 |

OTHER PUBLICATIONS

United States Patent and Trademark Office, U.S. Appl. No. 15/347,426, filed Nov. 9, 2016.
United States Patent and Trademark Office, U.S. Appl. No. 15/455,369, filed Mar. 10, 2017.
European Patent Office, Extended European Search Report for corresponding European Application No. 18186968.6, dated Feb. 13, 2019.

* cited by examiner ific structural and functional details disclosed herein are not to be interpreted as limiting, but merely as a representative basis for teaching one skilled in the art to variously employ the present invention.

AXLE ASSEMBLY HAVING A DRIVE PINION ASSEMBLY

TECHNICAL FIELD

This disclosure relates to an axle assembly that has a drive pinion assembly.

BACKGROUND

An axle assembly having a drive pinion is disclosed in U.S. patent application Ser. No. 15/347,426.

SUMMARY

In at least one embodiment, an axle assembly is provided. The axle assembly may include a drive pinion assembly. The drive pinion assembly may include a drive pinion body, a pinion gear, and a side gear. The drive pinion body may define a drive pinion passage that may extend along an axis. The drive pinion body may have a first end portion and a second end portion that may be disposed opposite the first end portion. The pinion gear may be fixedly disposed on the first end portion. The pinion gear may have a pinion gear hole that may receive the drive pinion body. The side gear may be fixedly disposed on the second end portion and may be integral with the drive pinion body or may be provided as a separate part.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
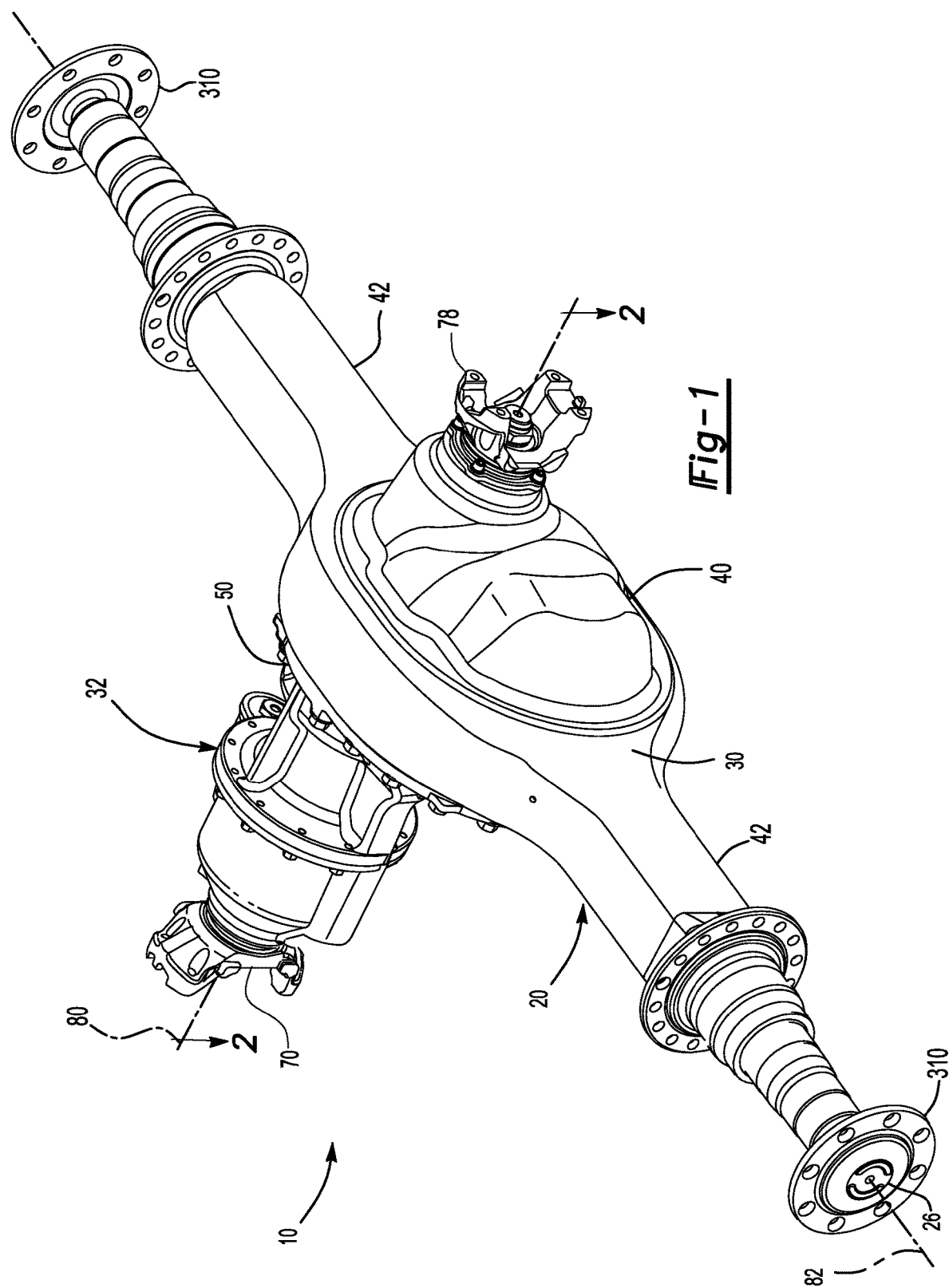
FIG. 1 is a perspective view of an axle assembly having a differential carrier that supports a differential assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series with a linkage, such as a prop shaft. As such, torque may be transmitted from a first axle assembly to a second axle assembly that is connected in series with the first axle assembly. As is best shown with reference to FIGS. 1 and 2, the axle assembly 10 may include a housing assembly 20, an interaxle differential unit 22, a differential assembly 24, and at least one axle shaft 26.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 26. In at least one configuration, the axle housing 30 may include a center portion 40 and at least one arm portion 42.

The center portion 40 may be disposed proximate the center of the axle housing 30. The center portion 40 may define a cavity that may receive the differential assembly 24. A lower region of the center portion 40 may at least partially define a sump portion that may contain lubricant. Splashed lubricant may flow down the sides of the center portion 40 and may flow over internal components of the axle assembly 10 and gather in the sump portion.

The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 24. The arm portions 42 may have substantially similar configurations. For example, the arm portions 42 may each have a hollow configuration or tubular configuration that may extend around the corresponding axle shaft 26 and may help separate or isolate the axle shaft 26 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 26.

Figure 2:
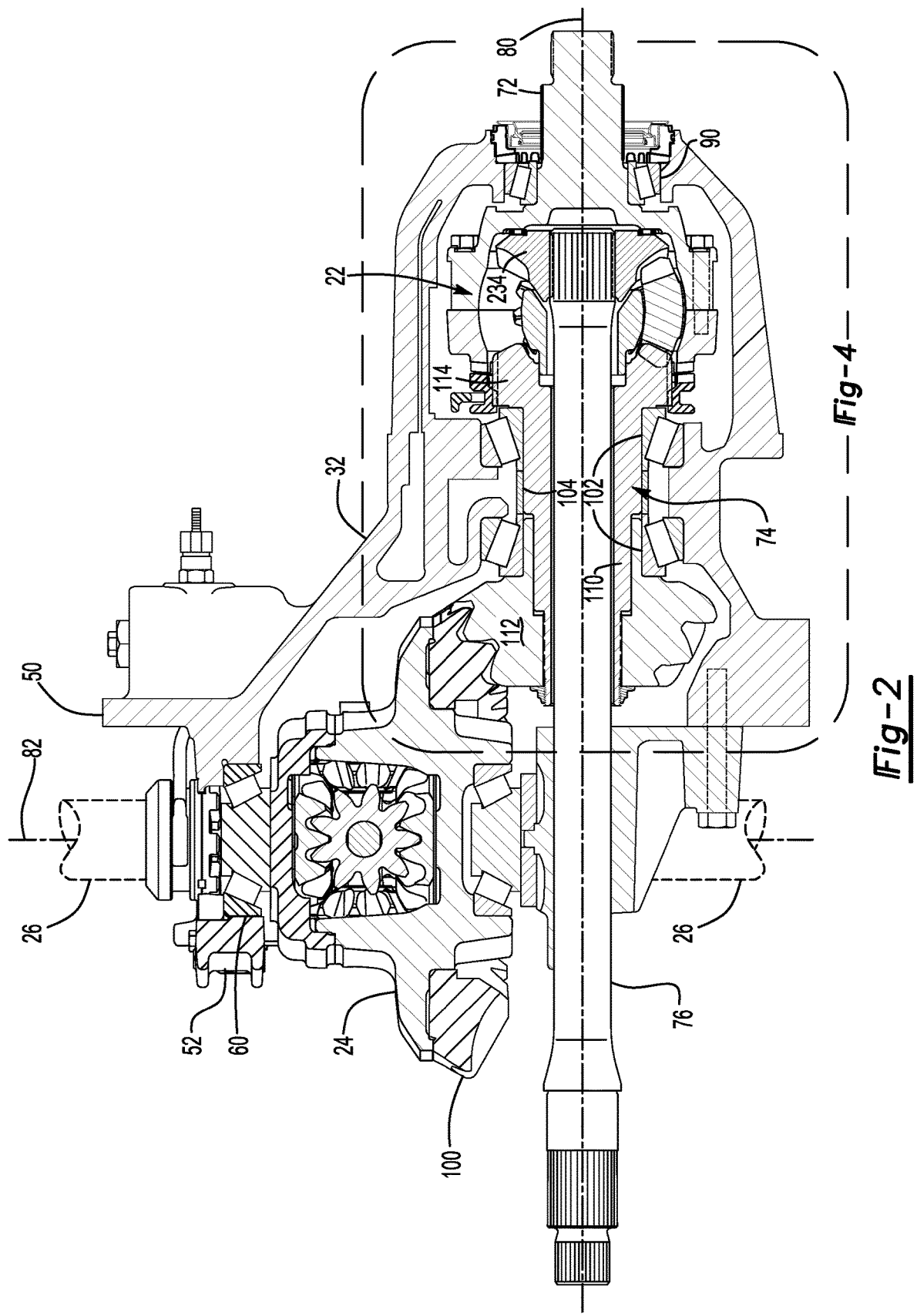
FIG. 2 is a section view of the differential carrier along section line 2-2.

Referring to FIGS. 1 and 2, the differential carrier 32, which may also be called a carrier housing, may be mounted to the center portion 40 of the axle housing 30. The differential carrier 32 may receive the interaxle differential unit 22 and may support the differential assembly 24. The differential carrier 32 may be configured as a single component or as multiple components that are assembled to each other. For instance, the differential carrier may include a first portion that is mounted to the axle housing 30 and a second portion that is mounted to the first portion that may receive the interaxle differential unit 22. As is best shown in FIG. 2, the differential carrier 32 may have a flange portion 50 and one or more bearing supports 52.

Referring to FIGS. 1 and 2, the flange portion 50 may facilitate mounting of the differential carrier 32 to the axle housing 30. For example, the flange portion 50 may be disposed on the carrier mounting surface of the axle housing 30 and may have a set of holes that may receive fasteners as previously discussed.

Referring to FIG. 2, the bearing support 52 may receive a roller bearing assembly 60 that may rotatably support the differential assembly 24. For example, two bearing supports 52 may be received in the center portion 40 and may be located proximate opposite sides of the differential assembly 24. The bearing support 52 may be provided in various configurations. For example, a bearing support 52 may include a pair of legs that extend from the differential carrier 32 and a bearing cap. The bearing cap may be mounted to the legs and may arch over a roller bearing assembly 60. In such a configuration, the bearing support 52 and bearing cap may cooperate to extend around, receive, and secure the roller bearing assembly 60. As another example, the bearing support 52 may be received inside a roller bearing assembly 60 which in turn may support the differential assembly 24.

Figure 3:
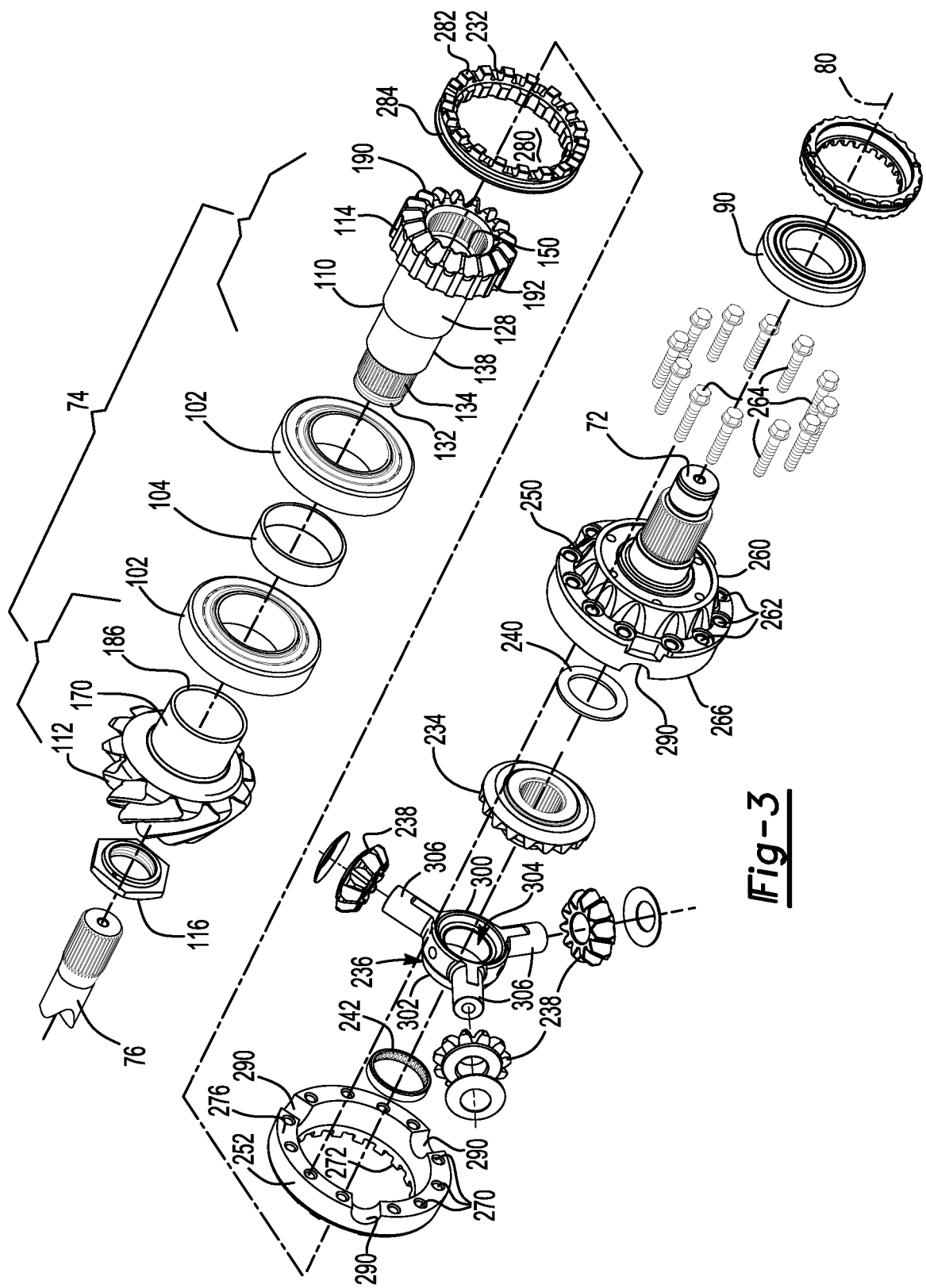
FIG. 3 is an exploded view of a portion of the differential carrier that includes a drive pinion assembly and an interaxle differential unit.

Referring to FIGS. 1-3, additional components that may be associated with the differential assembly 24 may include an input yoke 70, an input shaft 72, a drive pinion assembly 74, an output shaft 76, and an output yoke 78.

Referring to FIG. 1, the input yoke 70 may facilitate coupling of the axle assembly 10 to a torque source. For example, the input yoke 70 may be coupled to the drive shaft. The input yoke 70 may be disposed on the input shaft 72, the input shaft 72 being best shown in FIG. 2. For example, the input yoke 70 may have an opening that receives the input shaft 72 and may be secured to the input shaft 72 with a nut.

Referring to FIGS. 2 and 3, the input shaft 72 may extend along and may be configured to rotate about a first axis 80. For example, the input shaft 72 may be rotatably supported by one or more roller bearing assemblies 90 that may be disposed on the differential carrier 32. The input shaft 72 may be part of the interaxle differential unit 22 or may be operatively connected to the interaxle differential unit 22. For instance, the input shaft 72 may be integrally formed with a case of the interaxle differential unit 22 or may be provided as a separate component that is operatively connected or fixedly coupled to the case.

Referring to FIG. 2, the drive pinion assembly 74 may provide torque to a ring gear 100 that may be provided with the differential assembly 24. The drive pinion assembly 74 may extend around and may be rotatable about a first axis 80. The ring gear 100 may rotate about a second axis 82. The drive pinion assembly 74 may be coaxially disposed with the input shaft 72 and may be spaced apart from the input shaft 72. The drive pinion assembly 74 may be rotatably supported by one or more roller bearing assemblies 102 that may be disposed on the differential carrier 32. In FIG. 2, two roller bearing assemblies 102 are shown that are spaced apart from each other and separated by a spacer ring 104 that may extend around the drive pinion assembly 74. As is best shown with reference to FIGS. 3-5, the drive pinion assembly 74 may include a drive pinion body 110, a pinion gear 112, a side gear 114, and a nut 116.

The drive pinion body 110 may along the first axis 80. In at least one configuration, the drive pinion body 110 may include a first end portion 120, a second end portion 122, an inner drive pinion surface 124, a drive pinion passage 126, and a drive pinion outer surface 128.

The first end portion 120 may be disposed at a first end of the drive pinion body 110. The first end portion 120 may support the pinion gear 112 and may extend through a pinion gear hole in the pinion gear 112. As such, the drive pinion body 110 and the drive pinion passage 126 may extend completely through the pinion gear hole in the pinion gear 112. In at least one configuration, the first end portion 120 may include a first end surface 130, a threaded portion 132, a first spline 134, a first step surface 136, an intermediate surface 138, and a second step surface 140.

The first end surface 130 may be disposed at a first end of the drive pinion body 110. The first end surface 130 may extend from the inner drive pinion surface 124 to or toward the threaded portion 132.

The threaded portion 132 may be disposed opposite the inner drive pinion surface 124 and the drive pinion passage 126. The threaded portion 132 may protrude out of a pinion gear hole of the pinion gear 112. The nut 116 may threadingly engage the threaded portion 132 to secure the pinion gear 112 to the drive pinion body 110 and inhibit axial movement of the pinion gear 112 along the first axis 80 in a direction that extends toward the first end surface 130.

The first spline 134 may be axially positioned between the threaded portion 132 and the first step surface 136. The first spline 134 may include a plurality of teeth that may extend away from the drive pinion passage 126. The teeth may be disposed substantially parallel to the first axis 80 and may mate with a corresponding spline on a pinion gear 112 as will be discussed in more detail below.

The first step surface 136 may be axially positioned between the first spline 134 and the intermediate surface 138. The first step surface 136 may extend away from the first axis 80 and may generally extend from the first spline 134 to the intermediate surface 138.

The intermediate surface 138 may be axially positioned between the first step surface 136 and the second step surface 140. The intermediate surface 138 may have a larger diameter than the first spline 134 or may extend further away from the first axis 80 than the first spline 134. The intermediate surface 138 may be substantially cylindrical and may be at least partially disposed inside the pinion gear hole of the pinion gear 112. The intermediate surface 138 may engage and support the pinion gear 112.

The second step surface 140 may be axially positioned between the intermediate surface 138 and the drive pinion outer surface 128. The second step surface 140 may extend away from the first axis 80 and may extend from the intermediate surface 138 to the drive pinion outer surface 128.

The second end portion 122 may be disposed opposite the first end portion 120. In addition, the second end portion 122 may be disposed at a second end of the drive pinion body 110 that may be disposed opposite the first end. The second end portion 122 may include or may support the side gear 114 as will be discussed in more detail below. In at least one configuration, the second end portion 122 may include a second end surface 150.

Figure 4:
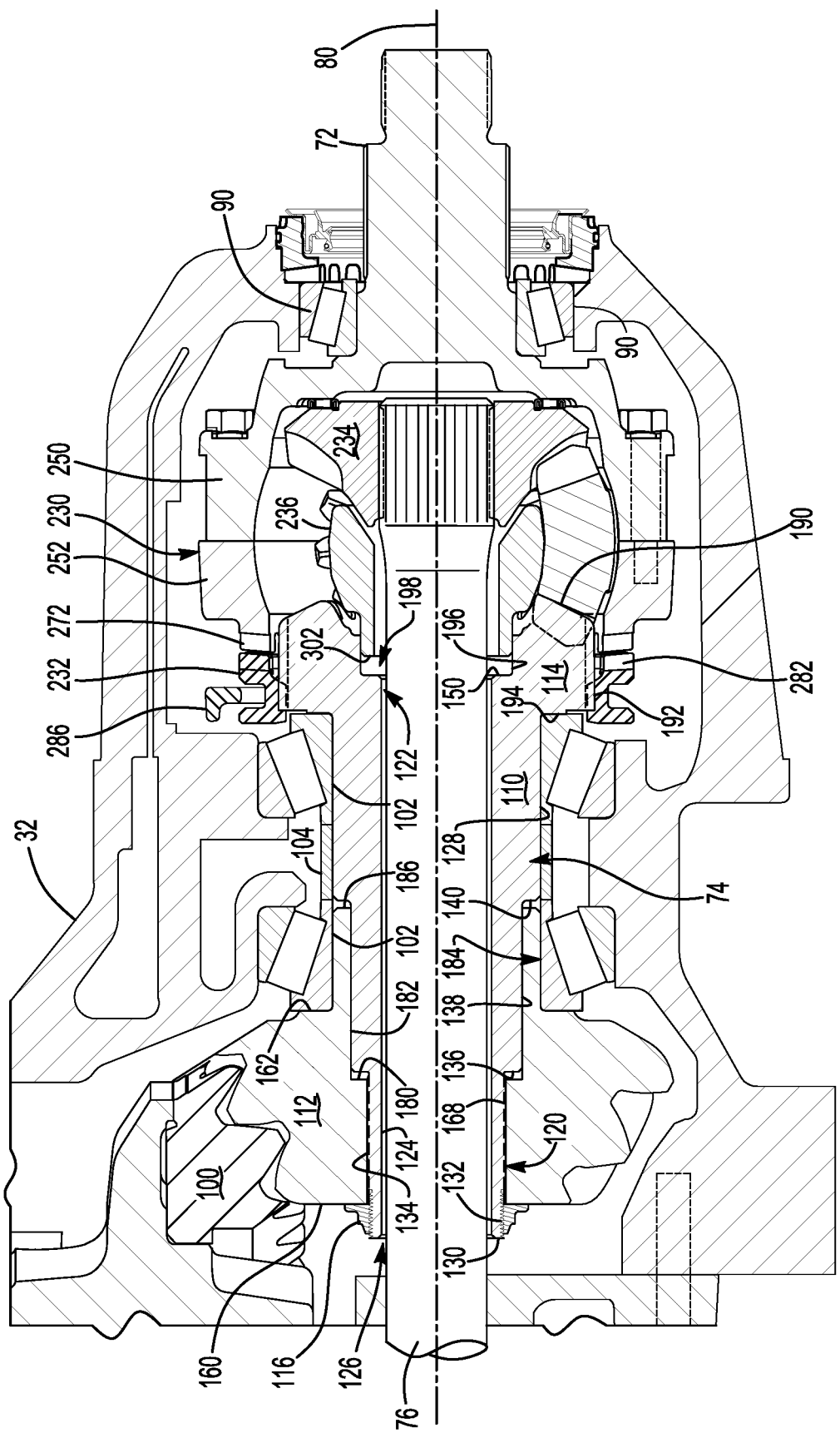
FIG. 4 is a magnified view of a portion of FIG. 2.

Referring to FIGS. 3 and 4, the second end surface 150 may be disposed opposite the first end surface 130. As such, the second end surface 150 may be disposed at a second end of the drive pinion body 110. The second end surface 150 may extend from the inner drive pinion surface 124 in a direction that extends away from the first axis 80.

The inner drive pinion surface 124 may extend from the first end surface 130 to the second end surface 150. The inner drive pinion surface 124 may be a through hole that may extend completely through the drive pinion body 110 and may define the drive pinion passage 126. The inner drive pinion surface 124 may be spaced apart from the first axis 80 and may be radially disposed with respect to the first axis 80. For example, the inner drive pinion surface 124 may be an inside circumference of the drive pinion assembly 74. The inner drive pinion surface 124 may be spaced apart from and may not engage the output shaft 76.

The drive pinion passage 126 may extend along the first axis 80. The output shaft 76 may extend through the drive pinion passage 126.

The drive pinion outer surface 128 may be disposed opposite the drive pinion passage 126. For example, the drive pinion outer surface 128 may face away from the first axis 80 and may be an outside circumference of a portion of the drive pinion body 110. In at least one configuration, the drive pinion outer surface 128 may extend in an axial direction from the second step surface 140 to the side gear 114. The drive pinion outer surface 128 may support one or more roller bearing assemblies 102.

Figure 5:
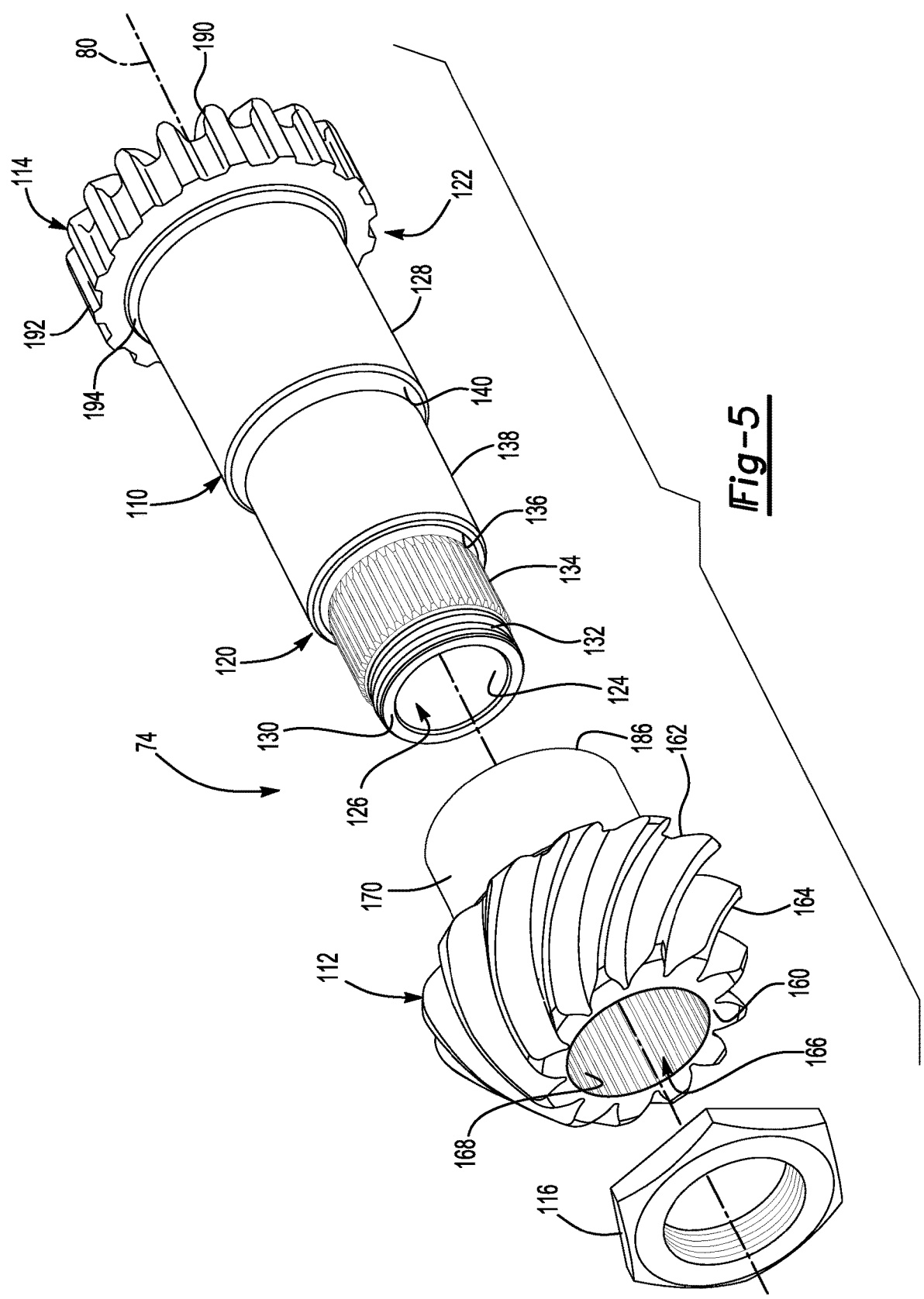
FIG. 5 is an exploded view of the drive pinion assembly of FIG. 4.

Referring to FIGS. 4 and 5, the pinion gear 112 may be a separate component from the drive pinion body 110. The pinion gear 112 may be fixedly disposed on the drive pinion body 110. For example, the pinion gear 112 may be fixedly disposed on the first end portion 120. In at least one configuration, the pinion gear 112 may have a first gear portion end surface 160, a second gear portion end surface 162, a plurality of pinion gear teeth 164, a pinion gear hole 166, a pinion gear spline 168, and a stem 170.

The first gear portion end surface 160 may be disposed at an end of the pinion gear 112. The first gear portion end surface 160 may face toward the differential assembly 24.

The second gear portion end surface 162 may be disposed opposite the first gear portion end surface 160. As such, the second gear portion end surface 162 may face toward the interaxle differential unit 22. The second gear portion end surface 162 may engage a roller bearing assembly 102 that may rotatably support the drive pinion assembly 74.

The plurality of pinion gear teeth 164 may extend between the first gear portion end surface 160 and the second gear portion end surface 162. The teeth may be arranged around the first axis 80 and may mate with teeth on the ring gear 100.

The pinion gear hole 166 may extend through the pinion gear 112 and may receive the drive pinion body 110. In at least one configuration, the pinion gear hole 166 may receive the pinion gear spline 168 and may include a pinion step surface 180 and an inner pinion surface 182.

Referring to FIG. 4, the pinion step surface 180 may be axially positioned between the pinion gear spline 168 and the inner pinion surface 182. In addition, the pinion step surface 180 may face toward the first step surface 136 of the drive pinion body 110. The pinion step surface 180 may extend away from the first axis 80 and may extend from the pinion gear spline 168 to the inner pinion surface 182.

The inner pinion surface 182 may be axially positioned between the pinion step surface 180 and an end of the pinion gear 112. In a pinion gear configuration that includes a stem 170, the inner pinion surface 182 may extend from the pinion step surface 180 to an end surface of the stem 170. In a pinion gear configuration that does not include a stem, such as is shown in FIGS. 6-11, the inner pinion surface 182 may extend from the pinion step surface 180 to the second gear portion end surface 162. The inner pinion surface 182 may at least partially define an enlarged bore 184. The enlarged bore 184 may extend from the pinion gear spline 168 may have a larger diameter than the pinion gear spline 168. The intermediate surface 138 may be substantially cylindrical and may extend around and may engage the intermediate surface 138 of the drive pinion body 110. It is also contemplated that the pinion gear 112 may be press-fit onto the drive pinion body 110 such that the inner pinion surface 182 is press fit against the intermediate surface 138.

The pinion gear spline 168 may be disposed in the pinion gear hole 166. The pinion gear spline 168 may be axially positioned between the first gear portion end surface 160 and the pinion step surface 180. The pinion gear spline 168 may include a plurality of teeth that may extend toward the first axis 80. The teeth may be disposed substantially parallel to the first axis 80 and may mate with the first spline 134 of the drive pinion body 110 to inhibit rotation of the pinion gear 112 about the first axis 80 with respect to the drive pinion body 110.

Optionally, the pinion gear 112 may also include a stem 170. The stem 170 may have a smaller outside diameter than the pinion gear teeth 164 and may extend from the second gear portion end surface 162 toward the side gear 114 and to a stem end surface 186. The stem end surface 186 may face toward the second step surface 140 of the drive pinion body 110. The stem 170 may partially define the enlarged bore 184 and may engage the drive pinion body 110. A roller bearing assembly 102 may receive the stem 170. As such, the roller bearing assembly 102 may rotatably support the stem 170 and hence the drive pinion body 110 and may separate the roller bearing assembly 102 from the drive pinion body 110 such that the roller bearing assembly 102 may be spaced apart from and may not engage the drive pinion body 110 in one or more embodiments.

Referring to FIGS. 3-5, the side gear 114 may be disposed on the drive pinion assembly 74. For example, the side gear 114 may be fixedly disposed on the second end portion 122 of the drive pinion body 110. In the configurations shown in FIGS. 3-7, the side gear 114 is integrally formed with the drive pinion body 110 such that the drive pinion body 110 and the side gear 114 have unitary one-piece construction and are a unitary one-piece component. Alternatively, the side gear may be a separate component from the drive pinion body as will be discussed in more detail below. Referring to FIGS. 4 and 5, the side gear 114 may include a first set of side gear teeth 190, a second set of side gear teeth 192, a side gear end surface 194, an inner side gear surface 196, and a side gear hole 198.

The first set of side gear teeth 190 may be arranged around the first axis 80 and may face toward the interaxle differential unit 22. The first set of side gear teeth 190 may mesh with one or more pinion gears of the interaxle differential unit 22 as will be discussed in more detail below.

The second set of side gear teeth 192 may be arranged around the first axis 80 and may extend radially away from the first axis 80. The second set of side gear teeth 192 may be disposed substantially parallel to the first axis 80 and may facilitate axial movement of a clutch collar as will be discussed in more detail below.

The side gear end surface 194 may be disposed opposite the first set of side gear teeth 190. As such, the side gear end surface 194 may face away from the interaxle differential unit 22. An inner race of a roller bearing assembly 102 that rotatably supports the drive pinion assembly 74 may engage the side gear end surface 194.

The inner side gear surface 196 may be disposed opposite the second set of side gear teeth 192. The inner side gear surface 196 may be radially disposed with respect to the first axis 80 and may at least partially define the side gear hole 198. The inner side gear surface 196 may have a larger diameter than the inner drive pinion surface 124 and the drive pinion passage 126. The side gear hole 198 may partially receive a spider of the interaxle differential unit 22 as will be discussed in more detail below. In addition, the inner side gear surface 196 may engage and may rotatably support the spider in one or more embodiments.

Figure 6:
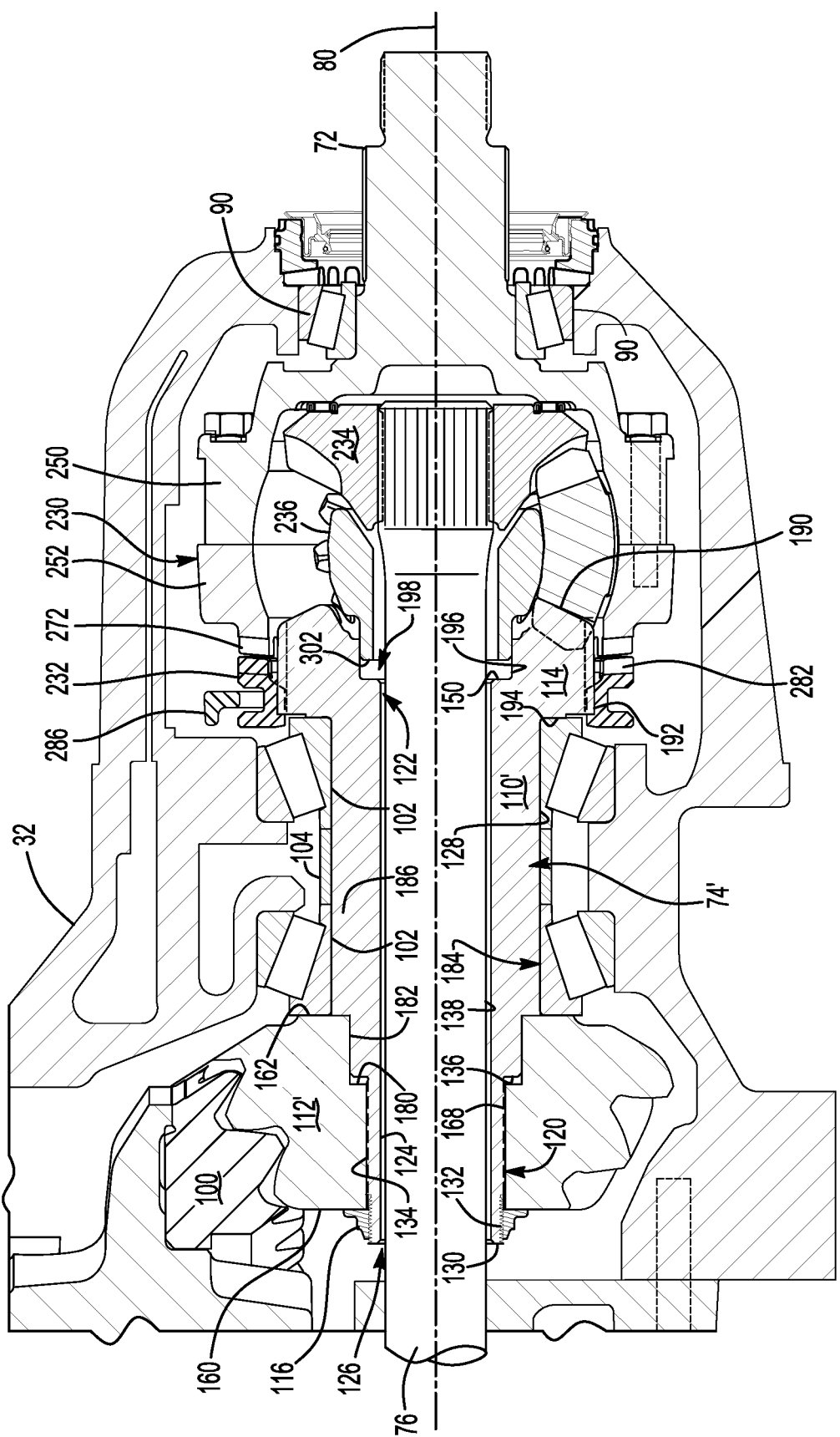
FIG. 6 is a magnified view of a portion of a differential carrier having a second embodiment of a drive pinion assembly.
Figure 7:
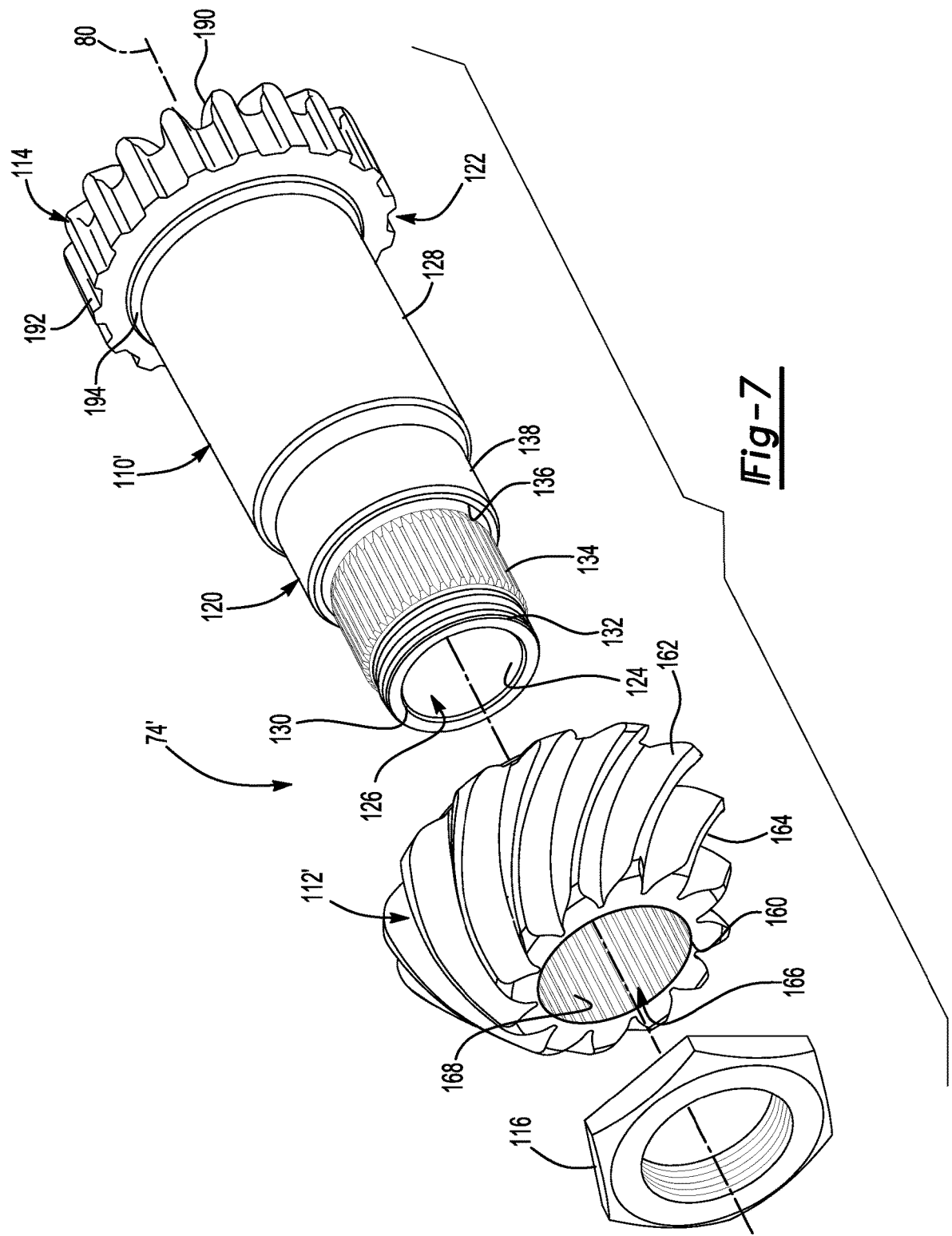
FIG. 7 is an exploded view of the drive pinion assembly of FIG. 6.

Referring to FIGS. 6 and 7, another embodiment of a drive pinion assembly 74' is shown. This embodiment is the same as the embodiment shown in FIGS. 4 and 5 except that the pinion gear 112' does not include a stem. As such, the roller bearing assembly 102 that is disposed adjacent to the pinion gear 112' may receive the drive pinion body 110' and have an inner race that may be disposed on the drive pinion outer surface 128 rather than the stem. In addition, the intermediate surface 138 of the drive pinion body 110' has a shorter axial length while the drive pinion outer surface 128 has a greater axial length.

Figure 8:
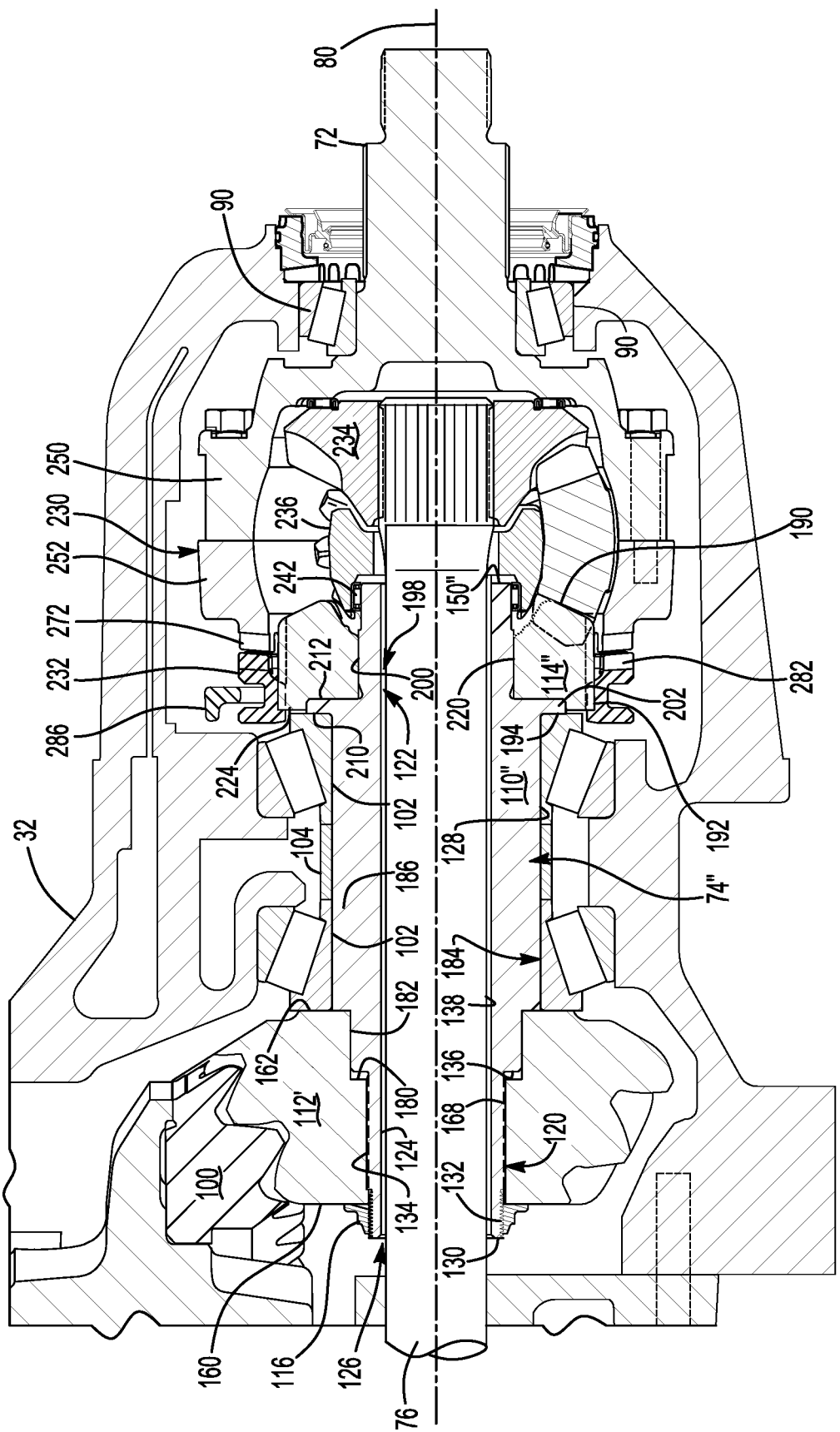
FIG. 8 is a magnified view of a portion of a differential carrier having a third embodiment of a drive pinion assembly.
Figure 9:
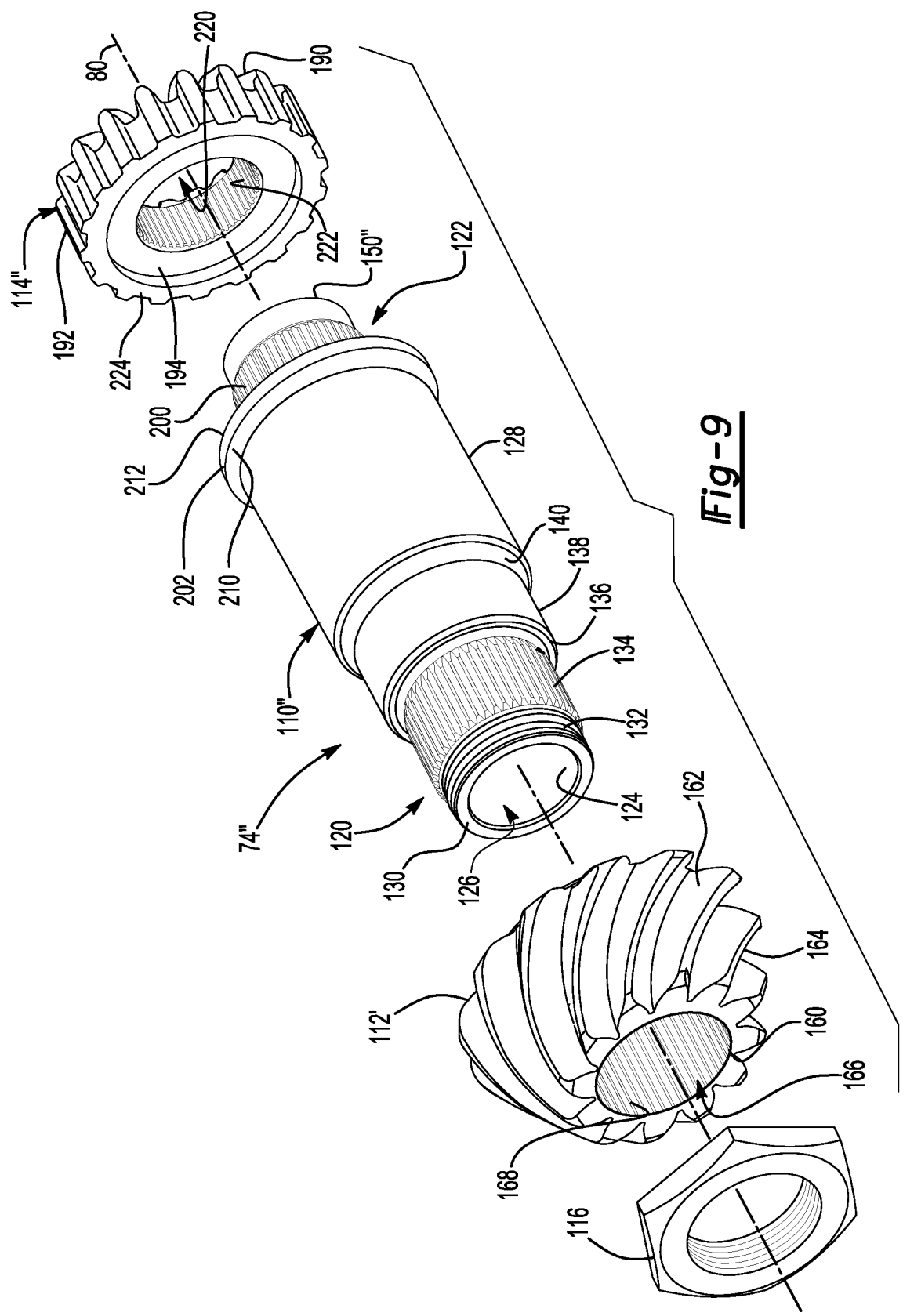
FIG. 9 is an exploded view of the drive pinion assembly of FIG. 8.

Referring to FIGS. 8 and 9, another embodiment of a drive pinion assembly 74" is shown. In this embodiment, drive pinion body 110" and the side gear 114" are separate components.

The drive pinion body 110" may have a first end portion 120 that may include a first end surface 130, a threaded portion 132, a first spline 134, a first step surface 136, an intermediate surface 138, and a second step surface 140 as previously discussed. The second end portion 122 may include a second end surface 150", a second spline 200, and a flange 202.

The second end surface 150" may be disposed opposite the first end surface 130 and may be received inside the spider of the interaxle differential unit 22.

The second spline 200 may be axially positioned between the second end surface 150" and the flange 202. The second spline 200 may include a plurality of teeth that may extend away from the drive pinion passage 126. The teeth may be disposed substantially parallel to the first axis 80 and may mate with a corresponding spline on the side gear 114".

The flange 202 may be disposed between the first end portion 120 and the second end portion 122. For example, the flange 202 may be axially positioned between the second spline 200 and the drive pinion outer surface 128. The flange 202 may extend away from the first axis 80 and may extend further from the first axis 80 than the drive pinion outer surface 128. As such, the flange 202 may be disposed behind the side gear 114" to inhibit axial movement of the side gear 114" toward the pinion gear 112'. The flange 202 may have a first flange surface 210 and a second flange surface 212.

The first flange surface 210 may face toward the pinion gear 112'. The first flange surface 210 may engage an inner race of a roller bearing assembly 102 that may rotatably support the drive pinion assembly 74". As such, the flange 202 may facilitate providing or setting a preload force on the roller bearing assembly 102 adjusting or setting the axial position of the drive pinion assembly 74".

The second flange surface 212 may be disposed opposite the first flange surface 210. The second flange surface 212 may engage the side gear 114". For example, the second flange surface 212 may engage the side gear end surface 194.

The side gear 114" may include a first set of side gear teeth 190, a second set of side gear teeth 192, and a side gear end surface 194 as previously described. In addition, the side gear 114" may include a side gear hole 220, a side gear spline 222, and a rim 224.

The side gear hole 220 may be a through hole that may extend through the side gear 114". The side gear hole 220 may receive the drive pinion body 110".

The side gear spline 222 may be disposed in the side gear hole 220. The side gear spline 222 may extend between the first set of side gear teeth 190 and the side gear end surface 194. The side gear spline 222 may include a plurality of teeth that may extend toward the first axis 80. The teeth may be disposed substantially parallel to the first axis 80 and may mate with the second spline 200 of the drive pinion body 110" to inhibit rotation of the side gear 114" about the first axis 80 with respect to the drive pinion body 110".

The rim 224, if provided, may extend from the side gear end surface 194 toward the roller bearing assembly 102. The rim 224 may be disposed adjacent to the second set of side gear teeth 192 and may extend at least partially around the flange 202 as is best shown in FIG. 8.

Figure 10:
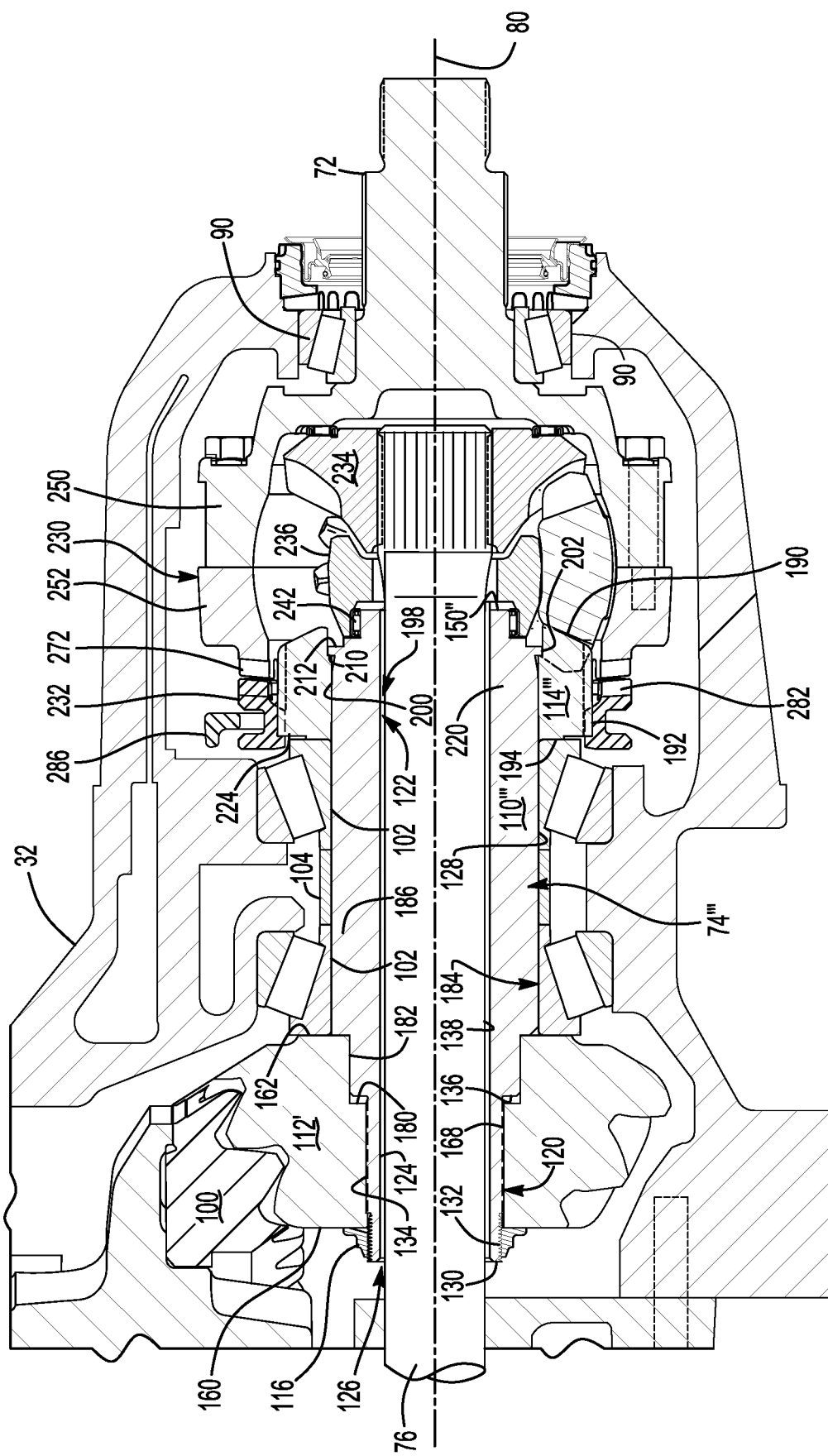
FIG. 10 is a magnified view of a portion of a differential carrier having a fourth embodiment of a drive pinion assembly.
Figure 11:
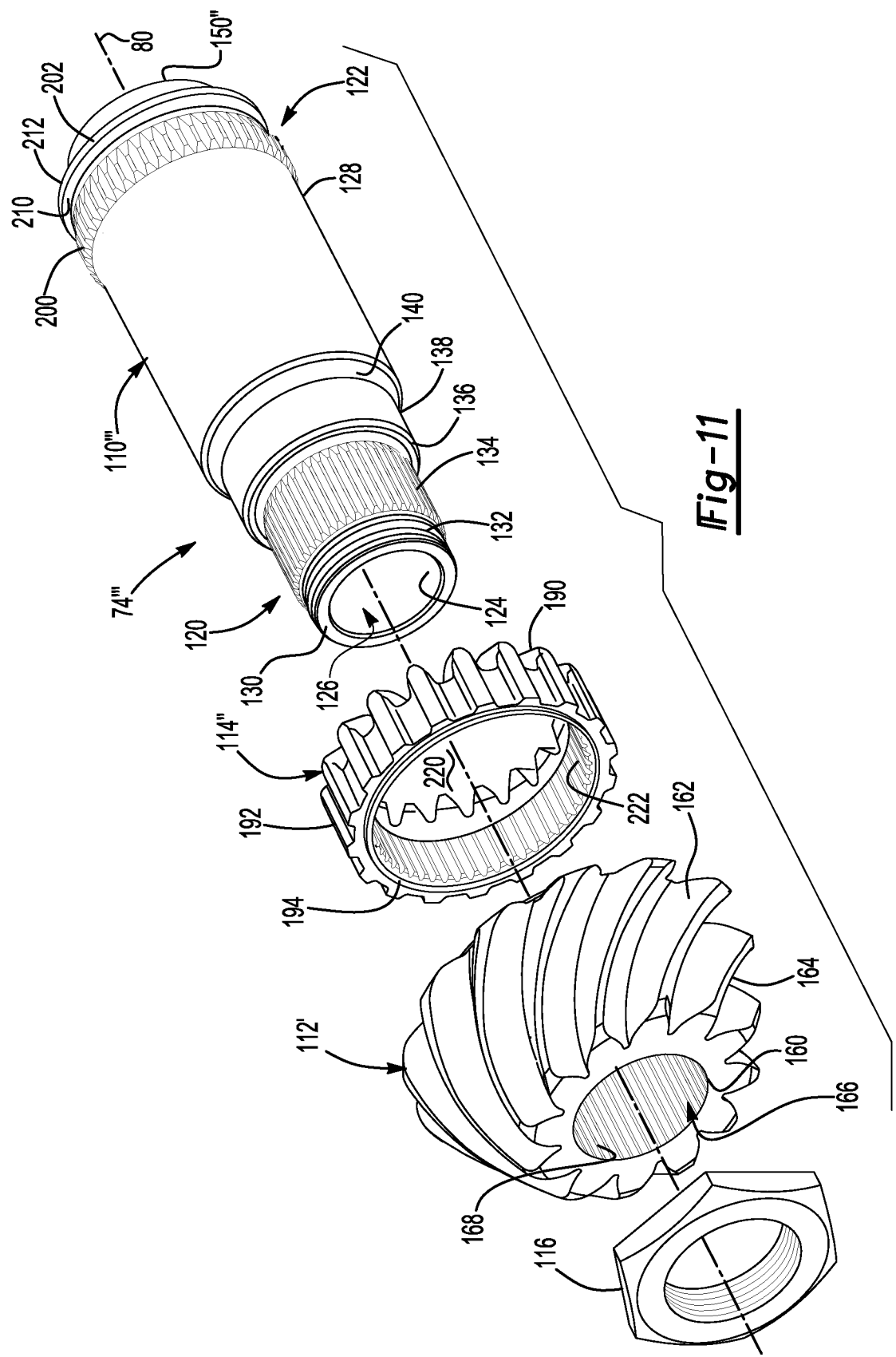
FIG. 11 is an exploded view of the drive pinion assembly of FIG. 10.

Referring to FIGS. 10 and 11, another embodiment of a drive pinion assembly 74''' is shown. In this embodiment, drive pinion body 110''' and the side gear 114''' are separate components.

The drive pinion body 110''' may have a first end portion 120 that may include a first end surface 130, a threaded portion 132, a first spline 134, a first step surface 136, an intermediate surface 138 and a second step surface 140 as previously discussed and may also have a second end surface 150". However, the positioning of the second spline 200 and flange 202 may be reversed. More specifically, the second spline 200 may be axially positioned between a roller bearing assembly 102 and the flange 202 while the flange 202 may be axially positioned between the second spline 200 and the second end surface 150". As such, the first flange surface 210 may face toward the pinion gear 112' and may engage the side gear 114''' to inhibit axial movement of the side gear 114' in a direction that extends away from the pinion gear 112'.

The side gear 114' may include a first set of side gear teeth 190, a second set of side gear teeth 192, a side gear end surface 194, a side gear hole 220, and a side gear spline 222 as previously described, but may not include a rim. The side gear hole 220 may receive the second spline 200 and the flange 202.

Referring to FIGS. 2 and 3, the output shaft 76 may extend along and may be configured to rotate about the first axis 80. For instance, the output shaft 76 may be supported by one or more roller bearings that may be disposed on the housing assembly 20. The output shaft 76 may extend through the drive pinion assembly and the drive pinion passage 126. In addition, the output shaft 76 may extend through a spider of the interaxle differential unit 22 as will be discussed in more detail below. The output shaft 76 may be coupled to the interaxle differential unit 22 at a first end. For example, the output shaft 76 may be fixedly coupled to a second side gear of the interaxle differential unit 22. The output shaft 76 may be fixedly coupled to the output yoke 78 at a second end that may be disposed opposite the first end.

Referring to FIG. 1, the output yoke 78 may facilitate coupling of the output shaft 76 to a second axle assembly that may be disposed in series with the axle assembly 10. For instance, the output yoke 78 may be coupled to a connecting shaft, such as a prop shaft, which in turn may be operatively connected to the second axle assembly.

Referring to FIG. 3, the interaxle differential unit 22 may operatively connect the input shaft 72 to the drive pinion assembly 74, 74', 74", 74' and/or the output shaft 76. The interaxle differential unit 22 may compensate for speed differences between different drive axle assemblies, such as speed differences between the axle assembly 10 and a second axle assembly. As is best shown with reference to FIGS. 3 and 4, the interaxle differential unit 22 may include a case 230, a clutch collar 232, a second side gear 234, a spider 236, a plurality of pinion gears 238, a thrust bearing 240, and an optional stabilizer bearing 242.

The case 230 may be configured to receive components of the interaxle differential unit 22. In addition, the case 230 may be rotatable about the first axis 80. In at least one configuration, the case 230 may include a first case portion 250 and a second case portion 252 that may cooperate to at least partially define a cavity. The cavity may at least partially receive the side gear 114, 114", 114''', second side gear 234, spider 236, pinion gears 238, thrust bearing 240, and the stabilizer bearing 242.

Referring to FIGS. 4 and 5, the first case portion 250 may receive at least a portion of the interaxle differential unit 22. In the configuration shown, the first case portion 250 is configured as a unitary or one piece component that includes the input shaft 72 and a first spider receiving portion 260.

Referring to FIGS. 3-5, the first spider receiving portion 260 may extend away from the first axis 80 and toward the second case portion 252. As is best shown in FIG. 3, the first spider receiving portion 260 may extend around a portion of the interaxle differential unit 22. The first spider receiving portion 260 may include a plurality of fastener holes 262 that may be arranged around the first axis 80. Each fastener holes 262 may be configured as a through hole that may receive a corresponding fastener 264, such as a bolt, that may fixedly couple the first case portion 250 to the second case portion 252. The first spider receiving portion 260 may also include a first end surface 266 that may face toward and may engage the second case portion 252.

Referring to FIGS. 3 and 4, the second case portion 252 may be disposed opposite the first case portion 250 and may receive at least a portion of the interaxle differential unit 22. The second case portion 252 may be configured as a ring that may extend around the first axis 80 and may include plurality of fastener holes 270 and a face gear 272.

The fastener holes 270 may be aligned with corresponding fastener holes 262 on the first case portion 250 and may receive a corresponding fastener 264. The fastener holes 270 may extend from a second end surface 276 that may face toward and may engage the first end surface 266.

The face gear 272 may be disposed opposite the second end surface 276. The face gear 272 may include a plurality of teeth that may be arranged around the first axis 80. The teeth may extend away from the first case portion 250 toward a clutch collar 232.

Referring to FIGS. 3 and 4, the clutch collar 232, which may also be referred to as a lock collar, may be moveably disposed on the second side gear 234. The clutch collar 232 may move axially or move along the first axis 80 between a retracted position and an extended position as will be discussed in more detail below. As is best shown in FIG. 3, the clutch collar 232 may be generally ring-shaped and may include a clutch collar hole 280, a clutch collar face gear 282, and a clutch collar groove 284.

The clutch collar hole 280 may extend through the clutch collar 232 and extend around the first axis 80. The clutch collar hole 280 may receive the second side gear 234. For example, the clutch collar 232 may have a spline that may extend into the clutch collar hole 280 and toward the first axis 80 and may mate with the second set of side gear teeth 192 of the side gear 114, 114", 114''. As such, the mating splines may allow the clutch collar 232 to move in an axial direction or along the first axis 80 while inhibiting rotation of the clutch collar 232 about the first axis 80 with respect to the side gear 114, 114", 114".

The clutch collar face gear 282 may include a set of teeth that may face toward the interaxle differential unit 22. The set of teeth may be arranged around the first axis 80 and may selectively engage the teeth of the face gear 272 of the second case portion 252 depending on the position of the clutch collar 232.

The clutch collar groove 284 may face away from the first axis 80 and may extend around the first axis 80. The clutch collar groove 284 may receive a shift fork 286, which is best shown in FIG. 4, that may operatively connect the clutch collar 232 to an actuator. The actuator may move the clutch collar 232 between an unlocked position and a locked position. The clutch collar face gear 282 may not engage the face gear 272 when the clutch collar 232 is in the unlocked position. As such, the drive pinion assembly 74, 74', 74", 74''' may be permitted to rotate with respect to the case 230. The clutch collar face gear 282 may engage and mesh with the face gear 272 when the clutch collar 232 is in the locked position, thereby inhibiting the drive pinion assembly 74, 74', 74", 74''' from rotating with respect to the case 230.

Referring to FIG. 3, the first case portion 250 may cooperate with the second case portion 252 to define one or more spider shaft holes 290. The spider shaft holes 290 may be generally disposed extend between the first end surface 266 of the first case portion 250 and the second end surface 276 of the second case portion 252. A spider shaft hole 290 may receive a shaft of the spider 236 as will be discussed in more detail below. In the configuration shown, three spider shaft holes 290 are shown; however, it is contemplated that a greater or lesser number of spider shaft holes 290 may be provided. The spider shaft holes 290 may be spaced apart from each other and may be arranged around the first axis 80. For example, spider shaft holes 290 may be disposed along axes that may be disposed substantially perpendicular to the first axis 80.

The second side gear 234 may be disposed on the output shaft 76. For example, the second side gear 234 may be disposed around the first axis 80 and may have a center bore that may receive the output shaft 76. The center bore may include a spline that may receive and engage a corresponding spline on the output shaft 76. As such, the second side gear 234 may not rotate about the first axis 80 with respect to the output shaft 76.

Referring to FIGS. 3 and 4, the spider 236 may be fixedly positioned with respect to the case 230 and may be rotatably disposed on the drive pinion assembly. The spider 236 may or may not engage the drive pinion assembly 74, 74', 74", 74''' as will be discussed in more detail below. The spider 236 may be spaced apart from and may not engage the output shaft 76. As such, the spider 236 may be rotatable with respect to the output shaft 76. In at least one configuration, spider 236 may include an annular spider body 300, an annular spider flange 302, a spider hole 304, and one or more spider shafts 306.

The annular spider body 300 may be axially positioned between the input shaft 72 and the drive pinion assembly 74, 74', 74", 74'". The annular spider body 300 may at least partially define the spider hole 304.

The annular spider flange 302 may extend from the annular spider body 300 in a direction that may extend away from the input shaft 72. The annular spider flange 302 may at least partially define the spider hole 304 and may support the drive pinion assembly or a stabilizer bearing 242 that in turn may support a drive pinion assembly as is best shown in FIGS. 8 and 10.

Referring to FIG. 3, one or more spider shafts 306 may extend from the annular spider body 300. In the configuration shown, three spider shafts 306 are provided; however, it is contemplated that a greater or lesser number of spider shafts 306 may be provided in one or more embodiments. The spider shafts 306 may be integrally formed with the annular spider body 300 or may be provided as separate components that are fixed to the annular spider body 300. Each spider shaft 306 may extend from the annular spider body 300 in a direction that extends away from the first axis 80 and away from the spider hole 304. For example, each spider shaft 306 may extend along a spider shaft axis that may be disposed substantially perpendicular to the first axis 80. In addition, an end of each spider shaft 306 may be received in a corresponding spider shaft hole 290 of the case 230. The spider shafts 306 may have a generally cylindrical configuration.

Referring to FIGS. 3 and 4, a pinion gear 238 may be rotatably disposed on a corresponding spider shaft 306. Each pinion gear 238 may have teeth that may mesh with teeth on the side gear 114, 114", 114'" and the second side gear 234.

Referring to FIG. 3, the thrust bearing 240 may be disposed between the case 230 and the second side gear 234. The thrust bearing 240 may rotatably support the second side gear 234 with respect to the first case portion 250.

Referring to FIGS. 8 and 10, an optional stabilizer bearing 242 may be provided. The stabilizer bearing 242 may rotatably support the spider 236. The stabilizer bearing 242 may be received in the annular spider flange 302 and may receive the drive pinion body 110", 110"'. The stabilizer bearing 242 may help limit or inhibit deflection of the output shaft 76 with respect to the first axis 80, which may also help maintain alignment, improve stability, and reduce vibration.

Referring to FIG. 2, the differential assembly 24 may be disposed in the center portion 40 of the housing assembly 20. The differential assembly 24 may transmit torque to the vehicle traction wheel assemblies and permit the traction wheel assemblies to rotate at different velocities. An abbreviated discussion of the operation of the differential assembly 24 follows with reference to FIGS. 1 and 2, beginning with the input yoke 70 shown in FIG. 1.

The input yoke 70 may be coupled to a vehicle drivetrain component, such as a drive shaft, that may be coupled to an output of a vehicle transmission or transfer case, which in turn may receive torque from a vehicle power source, such as an engine or motor. Alternatively, the input yoke 70 may be operatively connected to an output of another axle assembly. The input yoke 70 may be operatively connected to the input shaft 72, which in turn may be operatively connected to the drive pinion assembly 74, 74', 74", 74'". The drive pinion assembly 74, 74', 74", 74'" may provide torque to the ring gear 100 of the differential assembly 24. The differential assembly 24 may be operatively connected to the axle shafts 26 and may permit the axle shaft 26 to rotate at different rotational speeds in a manner known by those skilled in the art. As such, the differential assembly 24 may receive torque via the ring gear 100 and provide torque to the axle shafts 26.

Referring to FIGS. 1 and 2, the axle shafts 26 may transmit torque from the differential assembly 24 to corresponding traction wheel assemblies. For example, two axle shafts 26 may be provided such that each axle shaft 26 extends through a different arm portion 42 of axle housing 30. The axle shafts 26 may extend along and may be rotated about the second axis 82 by the differential assembly 24. Each axle shaft 26 may have a first end and a second end. The first end may be operatively connected to the differential assembly 24. The second end may be disposed opposite the first end and may be operatively connected to a wheel end assembly that may have a wheel hub that may support a wheel. As shown in FIG. 1, an axle flange 310 may be disposed proximate the second end of the axle shaft 26 and may facilitate coupling of the axle shaft 26 to the wheel hub.

The drive pinion assembly configurations described above may allow an axle assembly to be configured without a preload nut that is disposed on a drive pinion between the side gear and a roller bearing assembly that rotatably supports the drive pinion. This may allow the length of the drive pinion to be reduced, which in turn may allow the differential carrier standout or axial length of the differential carrier to be reduced, which may reduce cost and weight and provide a smaller package space. In addition, the drive pinion assembly configurations may allow a drive pinion body to be forged to a near-net or near-final shape and allow a forged side gear to be provided to increase strength and reduce fabrication costs. Moreover, such configurations may also help reduce noise, vibration, and harshness characteristics of the axle assembly when the interaxle differential unit and drive pinion are under dynamic loading that result from articulation of the suspension system that couples the axle assembly to a vehicle chassis.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a drive pinion assembly that includes:
        a drive pinion body that defines a drive pinion passage that extends around an axis, the drive pinion body having a first end portion and a second end portion disposed opposite the first end portion;
        a pinion gear that is fixedly disposed on the first end portion, wherein the pinion gear has a pinion gear hole that receives the drive pinion body; and
        a side gear that is fixedly disposed on the second end portion, wherein the side gear has a side gear hole that partially receives a spider of an interaxle differential unit that operatively connects an input shaft to an output shaft that extends through the drive pinion passage.

2. The axle assembly of claim 1 wherein the drive pinion body extends through the pinion gear hole such that the drive pinion body and the drive pinion passage extend completely through the pinion gear.

3. The axle assembly of claim 1 wherein the drive pinion body has a threaded portion that is disposed on the first end portion and is at least partially disposed outside the pinion gear hole, wherein a nut threadingly engages the threaded portion to secure the pinion gear to the drive pinion body.

4. The axle assembly of claim 1 wherein the pinion gear has a pinion gear spline that is disposed in the pinion gear hole and an inner pinion surface that at least partially defines an enlarged bore that extends from the pinion gear spline, wherein the pinion gear spline mates with a first spline of the drive pinion body to inhibit rotation of the pinion gear with respect to the drive pinion body and the enlarged bore has a larger diameter than the pinion gear hole and engages the drive pinion body.

5. The axle assembly of claim 4 further comprising a roller bearing assembly that rotatably supports the drive pinion assembly, wherein the pinion gear has a first gear portion end surface and a second gear portion end surface disposed opposite the first gear portion end surface and the roller bearing assembly receives the drive pinion body and engages the second gear portion end surface.

6. The axle assembly of claim 4 wherein the pinion gear has a first gear portion end surface, a second gear portion end surface disposed opposite the first gear portion end surface, and a stem that extends from the second gear portion end surface toward the side gear, wherein the stem partially defines the enlarged bore and engages the drive pinion body.

7. The axle assembly of claim 6 further comprising a roller bearing assembly that rotatably supports the drive pinion assembly, wherein the roller bearing assembly receives the stem and is spaced apart from the drive pinion body.

8. The axle assembly of claim 1 wherein the side gear is integral with the drive pinion body such that the side gear and drive pinion body have a unitary one-piece construction.

9. The axle assembly of claim 8 wherein the side gear has an inner side gear surface that is radially disposed with respect to the axis, wherein the inner side gear surface at least partially defines the side gear hole and the side gear hole has a larger diameter than the drive pinion passage.

10. The axle assembly of claim 9 wherein the inner side gear surface engages the spider.

11. The axle assembly of claim 9 wherein the side gear has a side gear end surface, wherein a roller bearing assembly receives the drive pinion body and engages the side gear end surface.

12. The axle assembly of claim 1 wherein the side gear hole receives the drive pinion body, and a side gear spline that is disposed in the side gear hole mates with a second spline that is disposed on the drive pinion body.

13. The axle assembly of claim 12 wherein the drive pinion body has a flange that extends away from the axis, wherein the flange has a first flange surface that engages a roller bearing assembly that rotatably supports the drive pinion assembly and a second flange surface that is disposed opposite the first flange surface and that engages the side gear.

14. The axle assembly of claim 13 wherein the drive pinion body has a first end surface, a second end surface disposed opposite the first end surface, and the second spline is disposed between the flange and the second end surface.

15. The axle assembly of claim 12 wherein the pinion gear, side gear, and drive pinion body are separate components and the drive pinion body is received in the pinion gear hole and the side gear hole.

16. An axle assembly comprising;
a drive pinion assembly that includes:
a drive pinion body that defines a drive pinion passage that extends around an axis, the drive pinion body having a first end portion a second end portion disposed opposite the first end portion, and a flange that extends away from the axis, wherein the flange has a first flange surface that engages a roller bearing assembly that rotatably supports the drive pinion assembly and a second flange surface that is disposed opposite the first flange surface;
a pinion gear that is fixedly disposed on the first end portion, wherein the pinion gear has a pinion gear hole that receives the drive pinion body; and
a side gear that is fixedly disposed on the second end portion, wherein the side gear engages the second flange surface and has a side gear end surface that engages the second flange surface and a rim that extends from the side gear end surface toward the roller bearing assembly and at least partially around the flange.

17. The axle assembly of claim 16 wherein the side gear has a side gear hole that receives the drive pinion body.

18. An axle assembly comprising:
a drive pinion assembly that includes:
a drive pinion body that defines a drive pinion passage that extends around an axis, the drive pinion body having a first end portion, a second end portion disposed opposite the first end portion, and a flange that extends away from the axis;
a pinion gear that is fixedly disposed on the first end portion, wherein the pinion gear has a pinion gear hole that receives the drive pinion body; and
a side gear that is fixedly disposed on the second end portion and has a side gear hole that receives the drive pinion body, wherein the flange is received in the side gear hole and inhibits axial movement of the side gear away from the pinion gear.

19. The axle assembly of claim 18 wherein the side gear extends from the flange to a roller bearing assembly that receives and rotatably supports the drive pinion assembly.

20. The axle assembly of claim 18 wherein the drive pinion body has a first end surface and a second end surface disposed opposite the first end surface and the drive pinion body has a second spline that is disposed between the flange and the first end surface and that mates with a side gear spline of the side gear that is disposed in the side gear hole.

* * * * *